(12) United States Patent  (10) Patent No.: US 9,082,457 B2
Okubo  (45) Date of Patent: Jul. 14, 2015

(54) DATA DECODING CONTROL APPARATUS, DATA STORAGE APPARATUS AND DATA DECODING METHOD

(71) Applicant: KABUSHIKI KAISHA TOSHIBA, Tokyo (JP)

(72) Inventor: Tomokazu Okubo, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 121 days.

(21) Appl. No.: 14/021,806

(22) Filed: Sep. 9, 2013

(65) Prior Publication Data

US 2014/0347761 A1    Nov. 27, 2014

Related U.S. Application Data

(60) Provisional application No. 61/826,657, filed on May 23, 2013.

(51) Int. Cl.
*G11B 20/18* (2006.01)
*G11B 20/10* (2006.01)

(52) U.S. Cl.
CPC ...... *G11B 20/1833* (2013.01); *G11B 20/10268* (2013.01); *G11B 20/10287* (2013.01); *G11B 20/10379* (2013.01); *G11B 20/18* (2013.01)

(58) Field of Classification Search
CPC ............. G11B 20/18; G11B 20/10287; G11B 20/1833; G11B 20/10268; G11B 20/10379
See application file for complete search history.

(56) References Cited

U.S. PATENT DOCUMENTS

| 5,390,195 | A | * | 2/1995 | Brush | 714/778 |
| 7,024,617 | B2 | * | 4/2006 | Sawaguchi et al. | 714/794 |
| 7,213,195 | B2 | * | 5/2007 | Sawaguchi et al. | 714/794 |
| 2003/0212951 | A1 | * | 11/2003 | Kim et al. | 714/799 |

FOREIGN PATENT DOCUMENTS

| JP | H10-199161 A | 7/1998 |
| JP | 2003-233-954 A | 8/2003 |
| JP | 2003-332917 A | 11/2003 |

* cited by examiner

*Primary Examiner* — John P Trimmings
(74) *Attorney, Agent, or Firm* — Knobbe Martens Olson & Bear LLP

(57) ABSTRACT

According to one embodiment, a data decoding control apparatus includes a reading controller and a decoding controller. The reading controller reads the encoded data of a symbol unit bit by bit from a storage medium. The decoding controller computes a log-likelihood ratio (LLR) value of the symbol unit for estimate decoding calculation relative to the encoded data based on the number of bit inversion in a symbol of the encoded data and a correction factor.

20 Claims, 4 Drawing Sheets

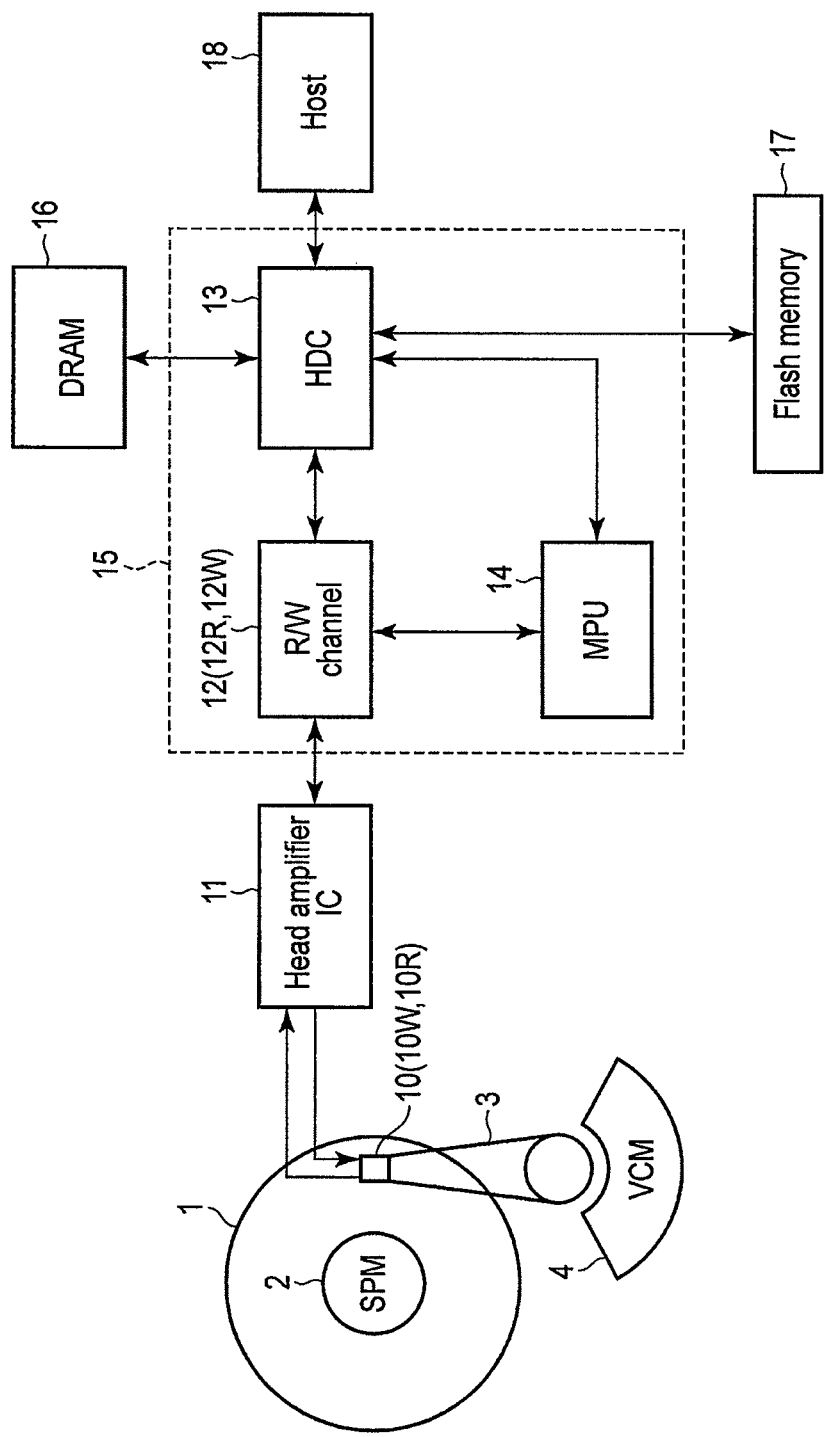
F I G. 1

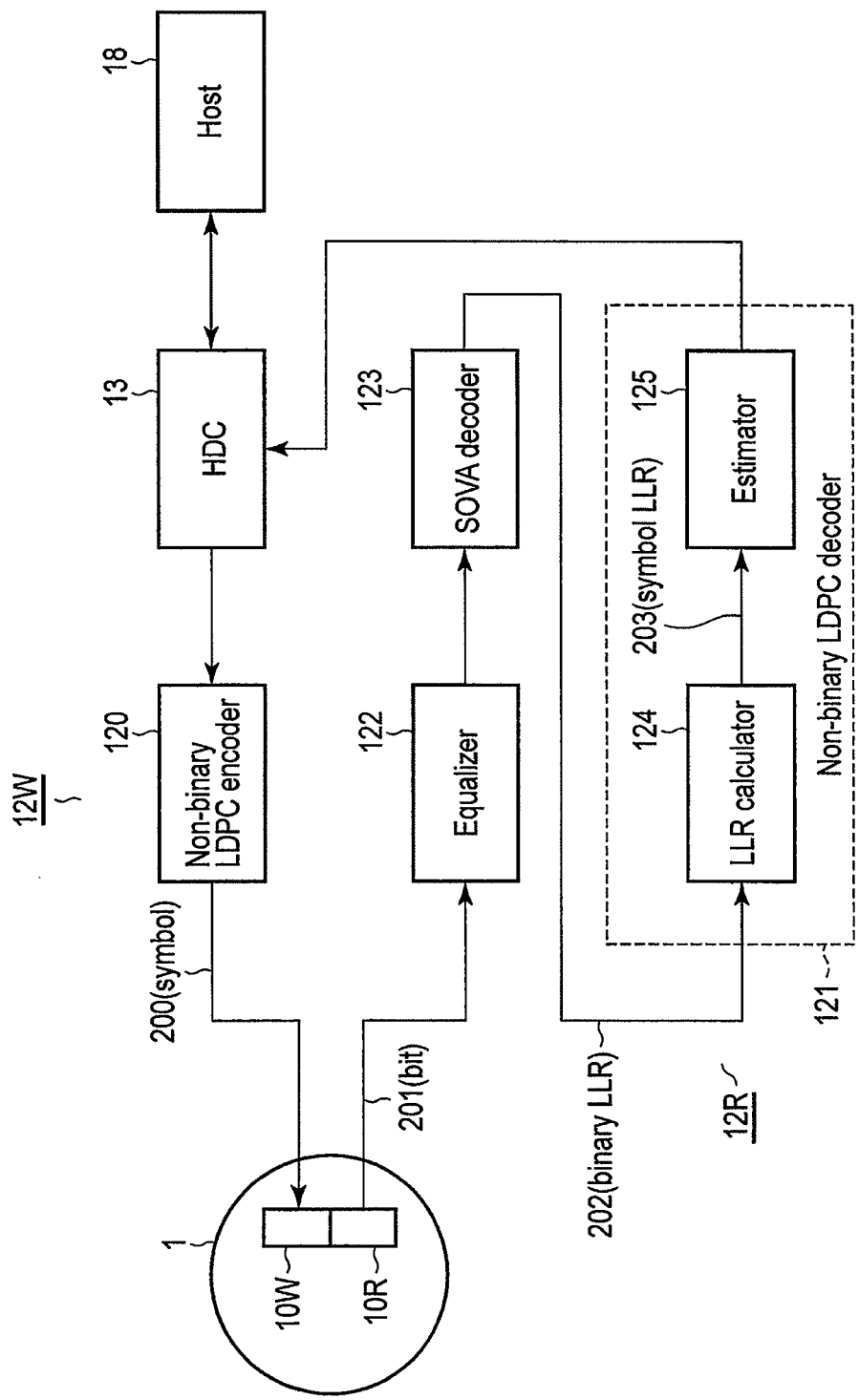
F I G. 2

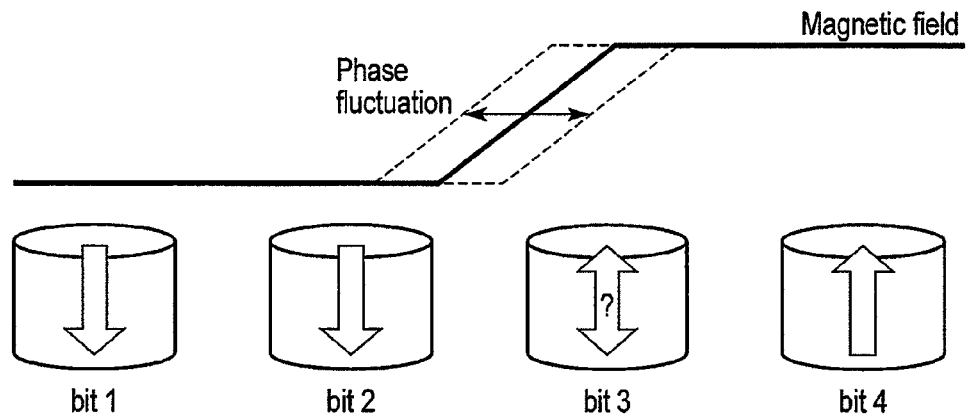
FIG. 3
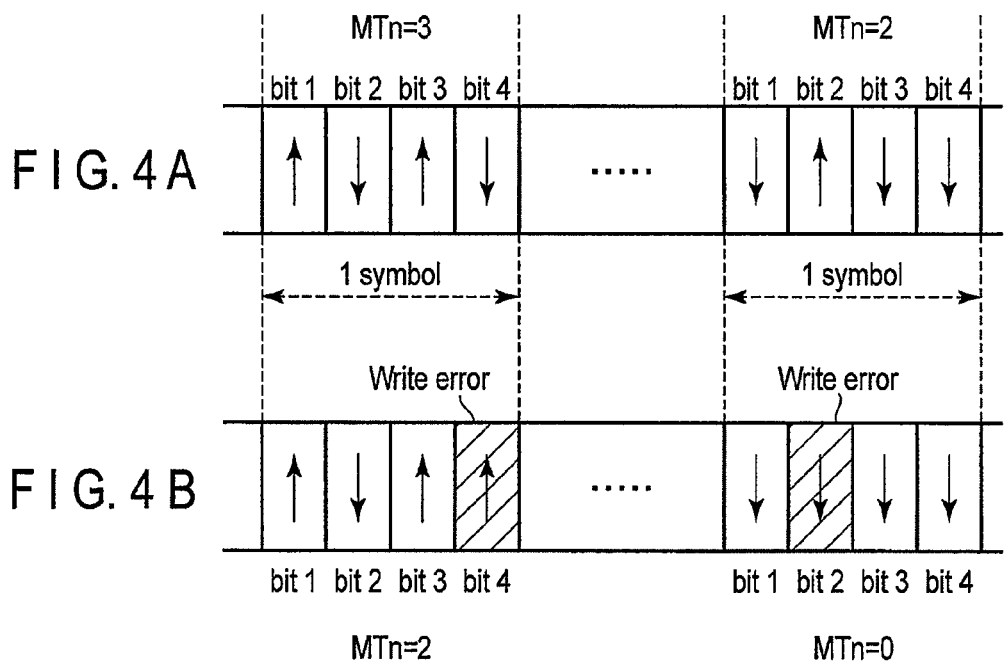
FIG. 4A
FIG. 4B

DATA DECODING CONTROL APPARATUS, DATA STORAGE APPARATUS AND DATA DECODING METHOD

CROSS-REFERENCE TO RELATED APPLICATIONS

This application claims the benefit of U.S. Provisional Application No. 61/826,657, filed May 23, 2013, the entire contents of which are incorporated herein by reference.

FIELD

Embodiments described herein relate generally to a data decoding control apparatus, data storage apparatus and data decoding method.

BACKGROUND

A general data storage apparatus such as a hard disk drive (HDD) encodes data when storing it on a storage medium and decodes the encoded data when reproducing it. The decoding processing includes error detection/correction to detect an error bit in a bit string of the encoded data and to correct it.

A disk drive realizing a bit-patterned recording (BPR) system in which a magnetic bit pattern is arranged on a disk being a storage medium has been proposed. The disk drive realizing the BPR system stores data on the disk by recording one bit of data in a magnetic cell. Thus, a recorded bit is always 0 or 1, and degradation of recording quality for a bit occurred as a factor of quality of a magnetic transition point is rare.

However, the disk drive still presents the risk of an erroneous bit being recorded around the magnetic transition point because of phase fluctuation or the extent of the recording magnetic field. In this case, since a bit is either 0 or 1 and does not have an intermediate state in the BPR system, if a recording failure occurs, bit inversion is produced instead of an ill-defined bit being recorded. For this reason, for an HDD realizing the BPR system, when a decoding method performing probabilistic estimate calculation based on the likelihood of an error bit is adopted, there are many cases where it is determined that the likelihood is high. That is, although it is desirable that a low likelihood is computed for an error bit, and error correction executed, accurate error detection/correction may be difficult when a decoding method merely performing probabilistic estimate calculation is adopted in the BPR system.

BRIEF DESCRIPTION OF THE DRAWINGS

FIG. 1 is an exemplary block diagram showing a configuration of a hard disk drive according to an embodiment.

FIG. 2 is an exemplary block diagram showing a configuration of a non-binary LDPC decoder and peripherals according to the embodiment.

FIG. 3 illustrates the magnetic recording state in BPR system according to the embodiment.

FIGS. 4A and 4B illustrate the relationship between an error bit and the number of magnetic transitions according to the embodiment.

DETAILED DESCRIPTION

Figure 5:
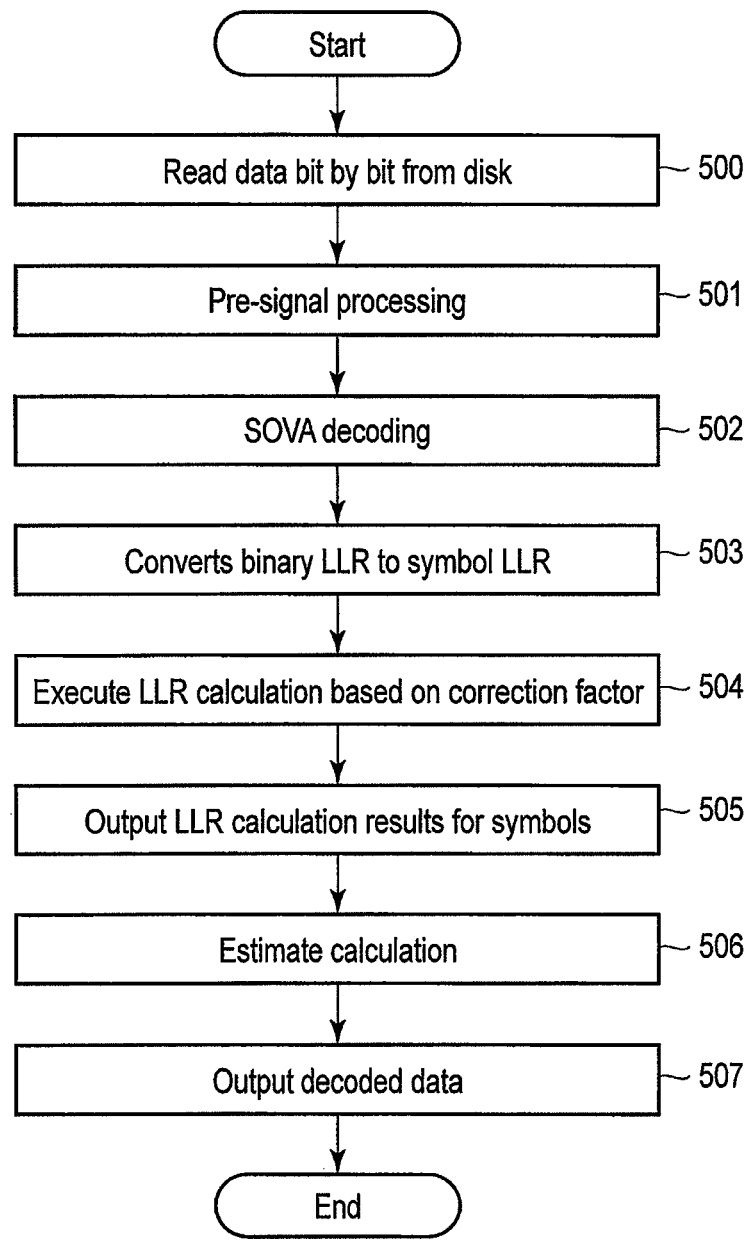
FIG. 5 is an exemplary flowchart showing the decoding method according to the embodiment.

In the subsequent, various embodiments will be described with reference to the drawings.

In general, according to one embodiment, a data decoding control apparatus includes a reading controller and a decoding controller. The reading controller reads encoded data of a symbol unit bit by bit. The decoding controller calculates a log-likelihood ratio (LLR) value of the symbol unit for estimate decoding calculation relative to the encoded data based on the number of bit inversion included in a symbol of the encoded data and a correction factor.

Configuration of Disk Drive

FIG. 1 is a block diagram showing the principal part of the hard disk drive (HDD) acting as a data storage apparatus of the present embodiment.

As shown in FIG. 1, the HDD includes a head-disk assembly (HDA), a head amplifier integrated circuit (head amplifier IC) 11 and a system controller 15 formed of a single-chip integrated circuit.

The HDA comprises a disk 1 acting as a storage medium, a spindle motor (SPM) 2, an arm 3 loading a head 10, and a voice coil motor (VCM) 4. The disk 1 rotates by the SPM 2. The arm 3 and VCM 4 form an actuator. The actuator moves the head 10 loaded in the arm 3 to a designated position on the disk 1 by driving the VCM 4.

The HDD according to the present embodiment realizes the bit-patterned recording (BPR) system. Accordingly, a magnetic bit pattern is preformed on the disk 1, and data is stored on the disk by recording one bit of data in a magnetic cell. The head 10 has a slider as a main body which comprises a write head 10W and a read head 10R. The read head 10R reads data recorded on the disk 1, and the write head 10W writes data on the disk 1. The head amplifier IC 11 comprises a read amplifier and a write driver. The read amplifier amplifies a read signal read by the read head 10R and transmits the amplified signal to a read/write (R/W) channel 12. The write driver transmits a write current according to write data output from the R/W channel 12 to the write head 10W.

The system controller (referred to as a controller as well) 15 comprises the R/W channel 12, a hard disk controller (HDC) 13, and a microprocessor (MPU) 14. The R/W channel 12 comprises a write channel 12W and a read channel 12R. The write channel 12W comprises a non-binary LDPC encoder 120 and performs encoding processing of the write data, as described later. The read channel 12R reproduces a read signal read from the disk 1 and decodes the read signal to obtain data. The read channel 12R comprises a non-binary LDPC decoder 121 as described later.

The HDC 13 controls data transfer between a host 18 and the R/W channel 12. The HDC 13 controls a buffer memory (dynamic random access memory [DRAM]) 16 and temporary stores the read data and write data on the DRAM 16 to perform data transfer control. The HDC 13 also controls a flash drive 17 to use it as a cache area to temporary store data, for example. The MPU 14 cooperates with the HDC 13 to control recording and reproducing of data through the R/W channel 12.

FIG. 2 is a block diagram showing a configuration of the non-binary LDPC decoder 121 and peripherals according to the embodiment As shown in FIG. 2, the non-binary LDPC encoder (encoder) 120 is included in the write channel 12W, and converts data transferred through the HDC 13 from the host 18 to encoded data with low-density parity-check (LDPC) codes. The encoder 120 converts data to encoded data 200 represented by four-bit symbols. The write head 10W writes the encoded data 200 generated by the encoder 120 on the disk 1 bit by bit. In the present embodiment, it is assumed that one symbol has four bits.

The read channel 12R comprises an equalizer 122, a SOVA decoder 123, and the non-binary LDPC decoder (LDPC decoder) 121. The equalizer 122 is included in the signal processor, and is a digital filter which performs wave equalization of a read signal read by the read head 10R from the disk 1. The signal processor comprises an analog to digital converter which converts a read signal to a digital signal.

The SOVA decoder 123 is a Viterbi decoder which performs decoding by the soft-output Viterbi algorithm (SOVA). As described later, the SOVA decoder 123 computes a log-likelihood ratio (LLR) value for each bit (binary LLR) 202.

The LDPC decoder 121 comprises a LLR calculator 124 and an estimator 125. The LLR calculator 124 calculates an LLR for each symbol (LLR of a symbol unit) 203 by combining the binary LLR of each bit within a symbol. In this case, the LLR calculator 124 changes a correction factor based on the number of bit inversion (the number of magnetic transition) included in a symbol, and calculates a LLR of a symbol unit by an equation using the correction factor.

The estimator 125 performs probabilistic estimate calculation by executing a sum-product decoding algorithm, for example, based on the LLR of a symbol unit obtained by the calculation of the LLR calculator 124, and calculates decoding data. The decoding data is no return to zero (NRZ) data, for example.

Decoding Processing

The decoding processing according to the present embodiment will be explained with reference to the flowcharts shown in FIGS. 3, 4A, 4B and 5.

FIG. 3 shows the magnetic recording state in the BPR system on the disk 1.

FIG. 3 shows the state where a recording magnetic field is applied on the disk 1. Bits 1 and 2 are recorded with the downward magnetization, and bits 3 and 4 are recorded with the upward magnetization. In this case, magnetization may be inverted around the magnetic transition point because of phase fluctuation or spatial gradient of the recording magnetic field, and a magnetic field may not be sufficiently applied. Under this circumstance, a bit does not have an intermediate state between 0 and 1 in the BPR system.

Concretely, there is a possibility that bit 3 is erroneously recorded with the downward magnetization as 0, instead of recorded with the upward magnetization as 1. In this case an erroneous bit string 0001 is recorded instead of 0011 on the disk 1, and a write error occurs. In the BPR system, bit 3 which is an error bit is sufficiently magnetized. Thus, there is a high possibility that the conventional LDPC decoder determines that the likelihood (LLR) of the error bit 3 is high, and the error bit 3 may be excluded from error correction in decoding processing.

FIGS. 4A and 4B show the relationship between the aforementioned write error and the number of magnetic transition (MTn).

FIG. 4A shows the state where each bit in a four-bit symbol is normally recorded. FIG. 4B shows the state where an error bit occurs in a four-bit symbol because of a write error.

In the BPR system, since one bit corresponds to one magnetic cell, it is confirmed that write errors caused for the aforementioned reasons are concentrated around the magnetic transition point. Accordingly, if it is assumed that write errors occur at each magnetic transition point with an equal probability, the number of magnetic transitions (MTn) within a symbol will decreased normally. That is, as shown in FIGS. 4A and 4B, if an error bit occurs in a symbol in which the number of magnetic transitions is 3 (MTn=3), the number of magnetic transitions of the symbol is decreased to 2 (MTn=2). Similarly, if an error bit occurs in a symbol in which the number of magnetic transitions is 2 (MTn=2), the number of magnetic transitions of the symbol is decreased to 0 (MTn=0). That is, if a write error occurs at the magnetic transition point relative to a random bit series, the occurrence frequency of a high-frequency pattern such as 1T relatively decreases, and the occurrence frequency of a low-frequency pattern relatively increases.

On the basis of the above, the decoding processing of the present embodiment will be explained with reference to the flowchart of FIG. 5.

First, as shown in FIG. 5, when recorded data is reproduced from the disk 1, the controller 15 reads data 201 recorded bit by bit by the read head 10R from the disk 1, and transmits it by the read channel 12R (block 500). As shown in FIG. 2, the controller 15 converts NRZ data which is write data to LDPC encoded data by the encoder 120 and writes it on the disk 1 when recording data. In the present embodiment, encoded data 200 represented by four-bit symbols is written to the disk 1 bit by bit.

The read channel 12R performs pre-signal processing inculding analog-to-digital conversion or wave equalization to the read signal read from the disk 1, and inputs the encoded data bit by bit to the SOVA decoder 123 (block 501). The SOVA decoder 123 performs Viterbi decoding calculation, and computes a bit LLR ($LLR_{bit}$) 202 obtained by the Viterbi decoding calculation (block 502).

At the LDPC decoder 121, the LLR calculator 124 converts the binary LLR calculated by the SOVA decoder 123 to a LLR of a symbol unit ($LLR_S$) 203 (block 503). Generally, a LLR of a symbol unit ($LLR_S$) is obtained by combining bit LLRs ($LLR_{bit}$), and is represented as $LLR_S = f(LLR_{bit}(1), LLR_{bit}(2), \ldots, LLR_{bit}(n))$, where $LLR_{bit}(n)$ represents an LLR of nth bit in the symbol. In the present embodiment, n=4 since one symbol has four bits.

The LLR calculator 124 computes a LLR of a symbol unit based on the number of bit inversion (the number of magnetic transitions) included in a symbol by the following equation using a correction factor α (block 504):

$$LLR_S(b3,b2,b1,b0) = [LLR_{bit}(3) \times b3 + LLR_{bit}(2) \times b2 + LLR_{bit}(2) \times b1 + LLR_{bit}(0) \times b0] \times (1 + \alpha \Sigma |b_{i+1} - b_i|). \quad (1)$$

In the equation (1), α (α>0) is a fixed correction factor. The correction factor α may be a value pre-optimized so that an error rate is optimal. The correction factor α may be set based on the difference between the frequency distribution of the frequency pattern of write data and the frequency distribution of the frequency pattern of reproduction NRZ data series. In the equation (1), $\Sigma |b_{i+1} - b_i|$ represents the sum of number of bit inversion (the number of magnetic transitions).

In the present embodiment, one symbol has four bits (b3, b2, b1, b0)). In this case, each bit of a bit string (b3, b2, b1, b0) within a symbol is 0 or 1, and 16 bit patterns from (0, 0, 0, 0) to (1, 1, 1, 1) can be taken. The number of bit inversion is determined based on the bit pattern. For example, for a bit string of (0, 0, 0, 0), the number of bit inversion is zero, and for a bit string of (1, 0, 0, 0), the number of bit inversion is one. For a bit string of (1, 0, 0, 1), the number of bit inversion is two, and for a bit string of (1, 0, 1, 0), the number of bit inversion is three.

That is, the LLR calculator 124 calculates a LLR of a symbol unit variable based on the number of bit inversion (number of magnetic transitions) for each bit pattern and a predetermined correction factor α for each LLR of a symbol unit of 16 bit patterns for four-bit symbols. The LLR calculator 124 outputs the LLR of a symbol unit for all 16 bit patterns to the estimator 125 (block 505).

The estimator 125 performs probabilistic estimate calculation based on each LLR of a symbol unit of 16 bit patterns, and performs detection/correction processing to an error bit (block 506). Then, the estimator 125 outputs NRZ data for each symbol in which an error bit has been corrected as decoded data (block 507).

According to the present embodiment, in an HDD realizing the BPR system and non-binary LDPC decoding, when LDPC decoding is performed based on the LLR of a symbol unit obtained from encoded data represented by symbols, the LLR of a symbol unit variable (or corrected) in accordance with the number of bit inversion (the number of magnetic transitions) included in each symbol is computed.

In the present embodiment, it can be assumed for encoded data to be read from the disk 1 and to be reproduced that the high-frequency pattern (in which the number of magnetic transitions is large) decreases, and the low-frequency pattern (in which the number of magnetic transitions is small) increases when a write error occurs relative to the encoded data to be recorded (refer to FIGS. 4A and 4B).

The LLR calculator 124 of the present embodiment computes a LLR of a symbol unit for a bit pattern in which the number of bit inversion (the number of magnetic transitions) is relatively large within a symbol based on a correction factor $\alpha$ so that the calculated LLR of a symbol unit becomes large. On the other hand, the LLR calculator 124 calculates a LLR of a symbol unit for a bit pattern in which the number of bit inversion (the number of magnetic transitions) is relatively small in a symbol based on a correction factor $\alpha$ so that the calculated LLR of a symbol unit becomes small. If the number of bit inversion is zero, the correction factor $\alpha$ in equation (1) will be invalidated.

By changing (or correcting) the LLR of a symbol unit in accordance with the number of bit inversion (the number of magnetic transitions) within a symbol, a probability that the encoded data has initially a high-frequency pattern can be reflected to a symbol having a low-frequency pattern. Concretely, the likelihood of an error bit in a symbol can be indirectly decreased. That is, by decreasing the LLR of a bit pattern in which the number of bit inversion is small, it is possible to indicate that the reliability of the bit pattern is low, and the possibility that an error bit is included is high to the estimator 125. With these features, it is possible to increase the probability that an error bit included in a symbol is corrected. Accordingly, it is possible to improve write error correction ability in the BPR system and to improve an error rate when reproducing data.

The present embodiment explains the encoded data represented by four-bit symbols (GF($2^4$) LDPC); however, the embodiment can be applied to other types of encoded data, such as data represented by three-bit symbols or six-bit symbols.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data decoding control apparatus comprising:
a reading controller configured to read encoded data of a symbol unit bit by bit;
a decoding controller configured to calculate a log-likelihood ratio (LLR) value of the symbol unit for estimate decoding calculation relative to the encoded data based on the number of bit inversion included in a symbol of the encoded data and a correction factor.

2. The data decoding control apparatus of claim 1, wherein the decoding controller is configured to calculate, with the correction factor which is a predetermined value, the LLR value of the symbol unit corresponding to the encoded data in which the number of bit inversion is large in the symbol so that the LLR value of the symbol unit becomes relatively large, and calculate the LLR value of the symbol unit corresponding to the encoded data in which the number of bit inversion is small in the symbol so that the LLR value of the symbol unit becomes relatively small.

3. The data decoding control apparatus of claim 2, wherein the decoding controller is configured to invalidate the correction factor when the number of bit inversion is zero, to validate the correction factor when the number of bit inversion is one or more, and to calculate the LLR value of the symbol unit in accordance with a value obtained by multiplying the number of bit inversion by the correction factor.

4. The data decoding control apparatus of claim 1, wherein the decoding controller is configured to calculate a LLR value of a bit unit corresponding to each bit of the encoded data of the symbol unit from the encoded data in a bit unit read by the reading controller, and to calculate the LLR value of the symbol unit by combining the LLR value of a bit unit.

5. The data decoding control apparatus of claim 1, wherein the decoding controller is configured to invalidate the correction factor when the number of bit inversion is zero, to validate the correction factor when the number of bit inversion is one or more, and to calculate the LLR value of the symbol unit in accordance with a value obtained by multiplying the number of bit inversion by the correction factor.

6. The data decoding control apparatus of claim 1, wherein the decoding controller is configured to calculate the LLR value of the symbol unit for each bit pattern in accordance with the number of bits of the encoded data of a symbol unit.

7. The data decoding control apparatus of claim 1, further comprising:
a low-density parity-check (LDPC) decoder configured to perform LDPC decoding for the encoded data of a symbol unit based on the LLR value of the symbol unit calculated by the decoding controller.

8. A data storage apparatus comprising:
a magnetic disk configured to store encoded data of a symbol unit bit by bit patterned recording (BPR); and
the data decoding control apparatus of claim 1, wherein the reading controller is configured to read the encoded data of a symbol unit bit by bit from the disk, and to transfer the encoded data to the decoding controller.

9. The data storage apparatus of claim 8, further comprising:
an encoding controller configured to generate the encoded data of a symbol unit to be stored on the magnetic disk.

10. The data storage apparatus of claim 8, wherein the decoding controller is configured to calculate, with the correction factor which is a predetermined value, a LLR value of the symbol unit corresponding to the encoded data in which the number of bit inversion is large in the symbol so that the LLR value of the symbol unit becomes relatively large, and calculate the LLR value of the symbol unit corresponding to the encoded data in which the number of bit inversion is small in the symbol so that the LLR value of the symbol unit becomes relatively small.

11. The data storage apparatus of claim 8, wherein the decoding controller is configured to calculate a LLR value of a bit unit corresponding to each bit of the encoded data of the symbol unit from the encoded data in a bit unit read by the reading controller, and to calculate the LLR value of the symbol unit by combining the LLR values of a bit unit.

12. The data storage apparatus of claim 8, wherein the decoding controller is configured to invalidate the correction factor when the number of bit inversion is zero, to validate the correction factor when the number of bit inversion is one or more, and to calculate the LLR value of the symbol unit in accordance with a value obtained by multiplying the number of bit inversion by the correction factor.

13. The data storage apparatus of claim 8, wherein the decoding controller is configured to calculate the LLR value of the symbol unit for each bit pattern in accordance with the number of bits of the encoded data of a symbol unit.

14. The data storage apparatus of claim 8, further comprising;
a low-density parity-check (LDPC) decoder configured to perform LDPC decoding for the encoded data of a symbol unit based on the LLR value of the symbol unit calculated by the decoding controller.

15. A method of data decoding, the method comprising:
reading encoded data of a symbol unit bit by bit from a storage medium; and
calculating a log-likelihood ratio (LLR) value of the symbol unit for estimate decoding calculation relative to the encoded data based on the number of bit inversion included in a symbol of the encoded data and a correction factor.

16. The method of claim 15, further comprising:
calculating, with the correction factor which is a predetermined value, the LLR value of the symbol unit corresponding to the encoded data in which the number of bit inversion is large in the symbol so that the LLR value of the symbol unit becomes relatively large, and calculating the LLR value of the symbol unit corresponding to the encoded data in which the number of bit inversion is small in the symbol so that the LLR value of the symbol unit becomes relatively small.

17. The method of claim 15, further comprising:
calculating a LLR value of a bit unit corresponding to each bit of the encoded data of the symbol unit from the read encoded data in a bit unit read; and
calculating the LLR value of the symbol unit by combining the LLR value of a bit unit.

18. The method of claim 15, further comprising:
invalidating the correction factor when the number of bit inversion is zero;
validating the correction factor when the number of bit inversion is one or more; and
calculating the LLR value of the symbol unit in accordance with a value obtained by multiplying the number of bit inversion by the correction factor.

19. The method of claim 15, further comprising:
calculating the LLR value of the symbol unit for each bit pattern in accordance with the number of bits of the encoded data of a symbol unit.

20. The method of claim 15, further comprising:
performing LDPC decoding for the encoded data of a symbol unit based on the calculated LLR value of the symbol unit.

* * * * *